(12) United States Patent
Bloching et al.

(10) Patent No.: US 8,813,034 B2
(45) Date of Patent: Aug. 19, 2014

(54) SYSTEM AND METHOD FOR TESTING A SOFTWARE UNIT OF AN APPLICATION

(75) Inventors: Uwe Bloching, Nussloch (DE); Stefan Rau, Dielheim (DE); Oliver Wetzel, Karlsruhe (DE)

(73) Assignee: SAP AG, Walldorf (DE)

( * ) Notice: Subject to any disclaimer, the term of this patent is extended or adjusted under 35 U.S.C. 154(b) by 525 days.

(21) Appl. No.: 12/982,663

(22) Filed: Dec. 30, 2010

(65) Prior Publication Data

US 2012/0173929 A1 Jul. 5, 2012

(51) Int. Cl.
G06F 9/44 (2006.01)
G06F 11/36 (2006.01)

(52) U.S. Cl.
CPC .................................. *G06F 11/3692* (2013.01)
USPC ............................ 717/124; 717/126; 717/131

(58) Field of Classification Search
None
See application file for complete search history.

(56) References Cited

U.S. PATENT DOCUMENTS

| | | | | |
|---|---|---|---|---|
| 5,651,111 A * | 7/1997 | McKeeman et al. | ......... | 714/38.1 |
| 5,708,774 A * | 1/1998 | Boden | ......................... | 714/38.1 |
| 6,275,976 B1 * | 8/2001 | Scandura | ...................... | 717/126 |
| 6,415,434 B1 * | 7/2002 | Kind | ............................. | 717/131 |
| 6,725,399 B1 * | 4/2004 | Bowman | .................... | 714/38.14 |
| 6,826,716 B2 * | 11/2004 | Mason | ......................... | 714/38.1 |
| 7,047,522 B1 * | 5/2006 | Dixon et al. | .................... | 717/131 |
| 7,506,311 B2 * | 3/2009 | Subramanian et al. | ....... | 717/124 |
| 7,587,636 B2 * | 9/2009 | Tillmann et al. | ............... | 717/124 |
| 7,603,658 B2 * | 10/2009 | Subramanian et al. | ....... | 717/126 |
| 7,624,380 B2 * | 11/2009 | Okada | ........................... | 717/131 |
| 7,908,590 B1 * | 3/2011 | Min et al. | ...................... | 717/126 |
| 8,370,809 B2 * | 2/2013 | Lawrance et al. | ............. | 717/124 |
| 8,601,436 B2 * | 12/2013 | Park et al. | ...................... | 717/124 |
| 8,683,446 B2 * | 3/2014 | Paradkar et al. | .............. | 717/126 |
| 2003/0097650 A1 * | 5/2003 | Bahrs et al. | .................... | 717/124 |
| 2007/0240127 A1 * | 10/2007 | Roques et al. | ................ | 717/136 |
| 2007/0277154 A1 * | 11/2007 | Badwe | .......................... | 717/124 |
| 2007/0283327 A1 * | 12/2007 | Mathew et al. | ................ | 717/124 |
| 2011/0131002 A1 * | 6/2011 | Sheye | ........................... | 702/123 |
| 2011/0138363 A1 * | 6/2011 | Schmelter et al. | ............ | 717/128 |

OTHER PUBLICATIONS

Briand, L.C.; Labiche, Y.; Soccar, G., Automating impact analysis and regression test selection based on UML designs, [Online] 2002, International Conference on Software Maintenance 2002, [Retrieved from the Internet]<http://ieeexplore.ieee.org/stamp/stamp.jsp?tp=&arnumber=1167775> pp. 252-261.*

(Continued)

*Primary Examiner* — Thuy Dao
*Assistant Examiner* — Ravi K Sinha
(74) *Attorney, Agent, or Firm* — Schwegman, Lundberg & Woessner, P.A.

(57) ABSTRACT

A system, computer readable storage medium including instructions, and a computer-implemented method for testing a software unit of an application is described. A method signature for a method of the software unit of the application is received. A generic test specification for a generic test of the method is identified based on the method signature, the generic test specification being one of a plurality of test specifications, wherein the generic test specification includes a definition for at least one reference input parameter value of the method and a definition for at least one reference output parameter value of the method. The method is executed using the at least one reference input parameter value to produce at least one test output parameter value. A test result is determined based on a comparison between the at least one test output parameter value and the at least one reference output parameter value.

19 Claims, 5 Drawing Sheets

(56) References Cited

OTHER PUBLICATIONS

Tao Xie; Notkin, D., Automatically identifying special and common unit tests for object-oriented programs, [Online] Nov. 2005, 16th IEEE International Symposium on Software Reliability Engineering, [Retrieved from the Internet] <http://ieeexplore.ieee.org/stamp/stamp.jsp?tp=&arnumber=1544742&isnumber=32973> 11 pages total.*

Paolo Tonella, Evolutionary testing of classes, [Online] 2004, In Proceedings of the 2004 ACM SIGSOFT international symposium on Software testing and analysis (ISSTA '04) ACM, New York, NY, [Retrieved from the Internet] <http://dl.acm.org/ft_gateway.cfm?id=1007528&type=pdf&CFID=450707335&CFTOKEN=58432044> pp. 119-128.*

* cited by examiner

SYSTEM AND METHOD FOR TESTING A SOFTWARE UNIT OF AN APPLICATION

TECHNICAL FIELD

The disclosed embodiments relate generally to a system and method for testing a software unit of an application.

BACKGROUND

Software developers typically test software prior to distributing the software to customers. One technique for testing software is a unit test, which is used to test a software unit (e.g., classes, methods, functions, procedures, etc.) to ensure that the functionality of the software unit is correct. Unit tests for software units are typically generated manually for each software unit. For large software applications, the process of defining and developing unit test is time-consuming and burdensome. Furthermore, in certain types of software architecture paradigms, manually generating unit tests is inefficient because the functionality of some software units may be substantially similar to the functionality of other software units.

BRIEF DESCRIPTION OF THE DRAWINGS

Like reference numerals refer to corresponding parts throughout the drawings.

DESCRIPTION OF EMBODIMENTS

Figure 1:
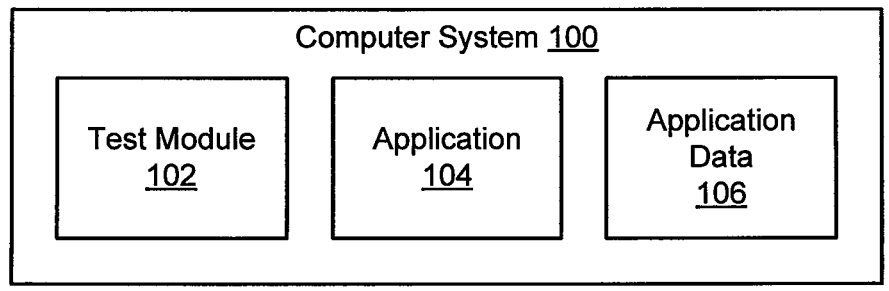
FIG. 1 is a block diagram illustrating an exemplary computer system, according to some embodiments.

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures and techniques have not been shown in detail.

Note that the term "method" when discussed with respect to an application and/or a software unit is used herein to refer to any unit of code, including, but not limited to, code included a class, a method, a function, and/or a procedure.

The embodiments described herein provide techniques for testing a software unit of an application. In some embodiments, the application is one of a plurality of applications conforming to a software architecture paradigm. A software architecture paradigm specifies a manner in which code for the software unit is to be written. For example, a software paradigm may specify the manner in which methods are to be named, the manner in which variables are named, the interface used between applications and/or software units within the applications, and the like. In some embodiments, the software architecture paradigm is a service oriented architecture (SOA) that provides a framework allowing multiple applications (or software units) to interoperate with each other. In some embodiments, the application includes a plurality of separate and distinct software units. In these embodiments, the software units may have been developed independently of each other, but may adhere to a particular software architecture paradigm. For example, a first software unit developed by a first group of software developers and a second software unit developed by a second group of software developers may adhere to a particular software architecture paradigm. In some embodiments, each application (or software unit) includes an application programming interface (API) that specifies the manner in which the methods may communicate and/or interoperate with each other within each application (or software unit) and across applications (or software units).

In some embodiments, the software unit includes a set of methods that perform related operations. For example, a first software unit may include a set of methods that performs operations related to purchase orders (e.g., creating, updating, deleting, etc.), a second software unit may include a set of methods that performs operations related to invoices (e.g., creating, updating, deleting, etc.), etc. In some embodiments, the software unit of the application is a business object that includes methods executable to perform operations associated with business logic (e.g., creating, updating, deleting purchase orders, etc.).

Figure 2:
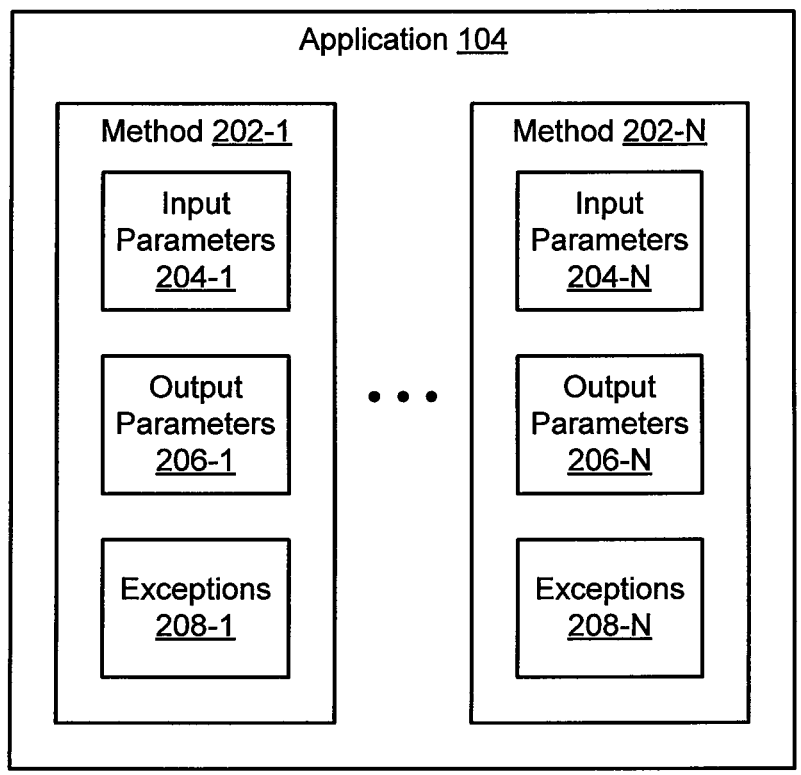
FIG. 2 is a block diagram illustrating an application programming interface, according to some embodiments.

FIG. 1 is a block diagram illustrating a computer system 100, according to some embodiments. The computer system 100 includes a test module 102 for an application 104, the application 104, and application data 106. In some embodiments, the application data 106 is stored in a database. As illustrated in FIG. 2, the application 104 may include methods 202-1 to 202-N. Each method 202 may include a name and code that, when executed, performs predetermined operations. Each method may also be associated with input parameters 204 (e.g., input variables, input variable types, etc.), output parameters 206 (e.g., output variables, output variable types, etc.), and exceptions 208 (e.g., types of exceptions that may be produced when there are errors, etc.). As discussed above, the application 104 may include separate and distinct software units that are used as components of the application 104. Each software unit may include a subset of the methods 202-1 to 202-N. For example, a first subset of the methods 202-1 to 202-N may be associated with creating purchase orders, a second subset of methods 202-1 to 202-N may be associated with creating invoices, etc.

As discussed above, existing techniques for testing software involve manually creating tests for software units. This process of creating the tests for software units is not only time-consuming, but is also inefficient. For example, consider a first software unit that performs operations related to purchase orders and a second software unit that performs operations related to invoices. A purchase order may include a header node that stores general data about the purchase order (e.g., creation date and time, the user that created the purchase order, etc.) and a plurality of item nodes that stores data for the items associated with the purchase order. Similarly, an invoice may include a header node that stores general data about the invoice (e.g., creation date and time, the user that created the purchase order, etc.) and a plurality of item nodes that stores data for the items associated with the invoice. The methods that create the header nodes and the item nodes for the purchase order and the methods that create the header nodes and the item nodes for the invoice perform similar operations: creating a header node in a database and creating a plurality of item nodes associated with the header node in the database. Using existing techniques, unit tests for these methods are created manually for each software unit. In other words, the unit tests for the methods that create header nodes for purchase orders and the unit tests for the methods that create header nodes for the invoices are manually created twice (e.g., hand-coded for each software unit). Similarly, the unit tests for the methods that create item nodes for purchase orders and the unit tests for the methods that create item nodes for the invoices are manually created twice. This duplication of these unit tests wastes time. In order to address these problems, some embodiments provide techniques for testing generic functionality of methods of an application. Note that the functionality that is common to two or more methods is referred to as "generic functionality" and a test that tests the generic functionality of a method is referred to as a "generic test."

Figure 3:
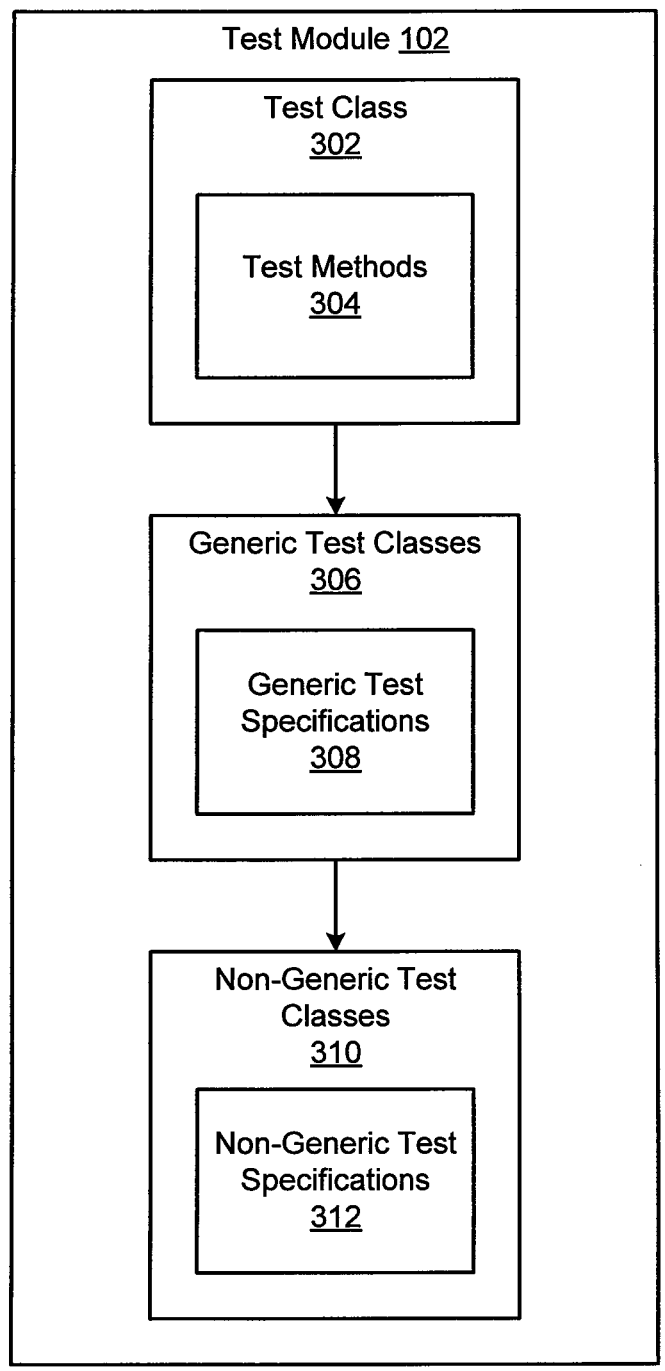
FIG. 3 is a block diagram illustrating a test module, according to some embodiments.

Attention is now directed to FIG. 3, which is a block diagram illustrating the test module 102, according to some embodiments. The test module 102 includes a test class 302 that includes test methods 304 that includes a framework for testing methods. For example, the test methods 304 may include methods that, when executed, perform a generic test to test generic functionality of a particular method in the application 104.

In some embodiments, the test module 102 includes generic test classes 306 that include generic test specifications 308 corresponding to generic tests. In these embodiments, a generic test specification is usable to test functionality that is common across a plurality of methods. In other words, the generic test specification is associated with a plurality of methods to test. For example, a first generic test specification may be used to test both a method that creates header nodes for a purchase order and a method that creates header nodes for invoices. Similarly, a second generic test specification may be used to test both a method that creates item nodes for a purchase order and a method that creates item nodes for invoices.

In some embodiments, a generic test specification is associated with a particular method type. Continuing the example from above, the first generic test specification may be associated with methods that create header nodes and the second generic test specification may be associated with methods that create item nodes. In some embodiments, the method type include a method that creates data, a method that updates data, a method that retrieves data, a method that deletes data, a method that triggers an action, a method that queries data, and a method that facilitates navigation between software units of the application. Note that the embodiments described herein may be applied to other method types.

In some embodiments, a generic test specification is identified by an associated method signature. In some embodiments, a method signature includes input parameters and output parameters of the method. For example, continuing the example from above, a method signature for the first generic test specification may include the input parameters DATA and no output parameters. A method signature for the second generic test specification may include the input parameters NODE_KEY and DATA and no output parameters. In some embodiments, the method signature includes a method type of the method. For example, continuing the example from above, the first generic test specification may be associated with methods that create header nodes and that includes the input parameters DATA and no output parameters. Similarly, the second generic test specification may be associated with methods that create item nodes and that include input parameters NODE_KEY and DATA and no output parameters.

In some embodiments, the generic test specification includes a definition for reference input parameter values of a method and a definition for reference output parameters value of a method. In these embodiments, the definition for the reference input parameter values and the reference output parameter values of a method are not actual values, but are definitions of what the values are. For example, a definition for a reference input parameter value may state that the generic test requires a valid value for an input parameter. In this case, the test module 102 may obtain a valid value for the input parameter from the application data 106. Similarly, another definition for a reference input parameter value may state that the generic test requires an invalid value for an input parameter. In this case, the test module 102 may determine an invalid value for the input parameter based on the application data 106.

In some embodiments, the generic test specification includes exceptions of the method. In these embodiments, a method signature associated with the generic test specification includes exceptions of the method. In some embodiments, the generic test specification includes a definition for at least one reference exception for the method.

In some embodiments, a generic test specification is usable to perform a negative test that tests whether a method produces expected values for output parameter in response to invalid values for input parameters. A positive test (e.g., a test that tests whether a method produces expected values for output parameters in response to valid values for input parameters) is typically difficult to test generically because positive tests typically require specific knowledge about the logic of the method (e.g., business logic). Positive tests are typically handled by non-generic tests, as described herein.

In summary, a generic test specification for a generic test may be associated with a particular method type and method signature (e.g., input parameters, output parameters, and/or exceptions of the method). Furthermore, a generic test reduces the number of unit tests that need to be created. For example, a single generic test may be used to test whether methods that create header nodes are functionally correct.

In some embodiments, a generic test for a particular method exists when a generic test specification associated with a method type of the particular method exists and the method signature associated with the generic test specification corresponds to the method signature for the particular method. For example, continuing the example from above, a first method that creates header nodes (e.g., the method type) and that has an input parameter DATA and no output parameters may be tested using a generic test associated with the first generic test specification. However, a second method that creates header nodes (e.g., the method type) and has input parameters NODE_KEY and DATA and no output parameters may not be tested using the generic test associated with the first generic test specification. Assuming that there are no generic test specifications that correspond to the second method, the second method may not be tested generically. In general, when the method type and/or a method signature of a generic test specification do not correspond to the method type and/or a method signature of a method to be tested, the method to be tested cannot be tested using a generic test. In some embodiments, a non-generic test is used when a generic test cannot be used to test a method.

Referring to FIG. 3, the test module 102 includes a non-generic test classes 310 that includes non-generic test specifications 312 corresponding to non-generic tests. A non-generic test is used when a method cannot be tested using a generic test. Non-generic test specifications are similar to the generic test specification described above.

In some embodiments, the generic test classes 306 are derived from the test class 302. In some embodiments, the non-generic test classes 310 are derived from the test class 302. In some embodiments, the non-generic test classes 310 are derived from the generic test classes 306.

Testing Methods

Figure 4:
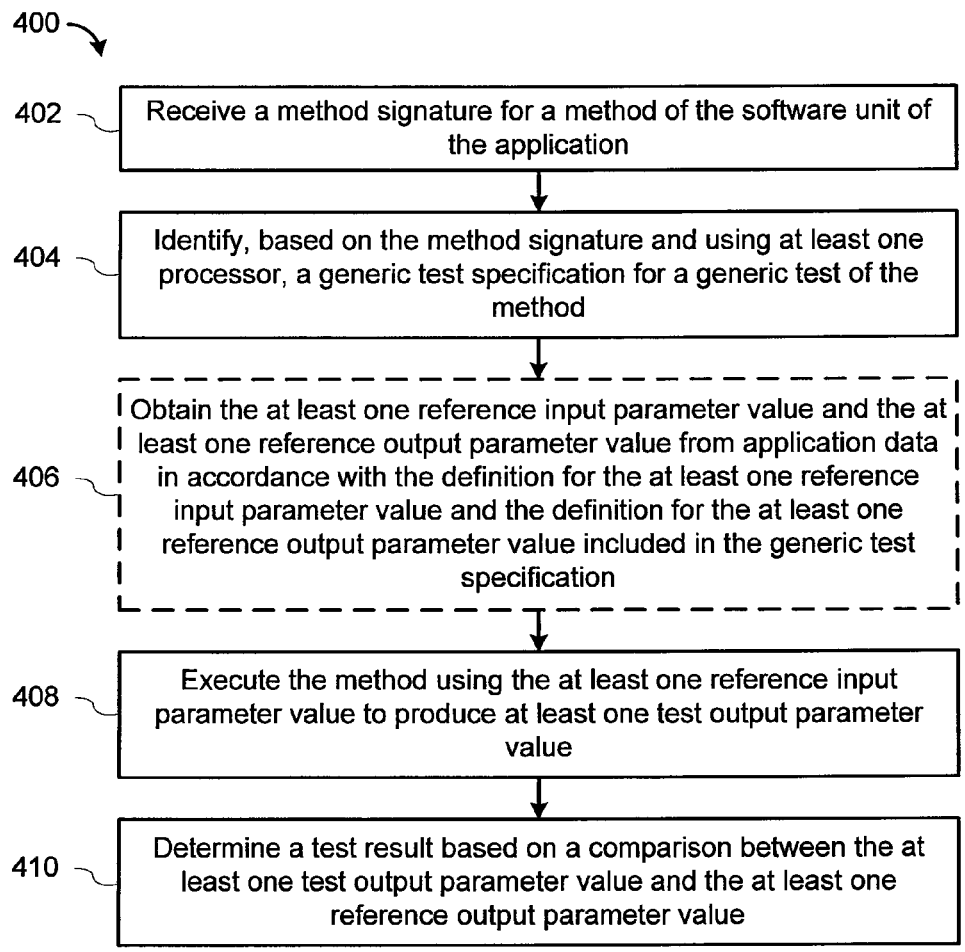
FIG. 4 is a flowchart of a method for testing a software unit of an application using a generic test, according to some embodiments.

FIG. 4 is a flowchart of a method 400 for testing a software unit of an application using a generic test, according to some embodiments. The test module 102 receives (402) a method signature for a method of the software unit of the application. Next, the test module identifies (404), based on the method signature, a generic test specification for a generic test of the method.

In some embodiments, the test module 102 obtains (406) the at least one reference input parameter value and the at least one reference output parameter value from application data in accordance with the definition for the at least one reference input parameter value and the definition for the at least one reference output parameter value included in the generic test specification.

The test module 102 then executes (408) the method using the at least one reference input parameter value to produce at least one test output parameter value and determines (410) a test result based on a comparison between the at least one test output parameter value and the at least one reference output parameter value. In some embodiments, the at least one reference input parameter value defined in the generic test specification is an invalid value determined from application data. In some embodiments, the test result indicates that the method passes the generic test when each of the at least one test output parameter value corresponds to each of the at least one reference output parameter value. In some embodiments, the test result indicates that the method fails the generic test when each of the at least one test output parameter value does not correspond to each of the at least one reference output parameter value.

Figure 5:
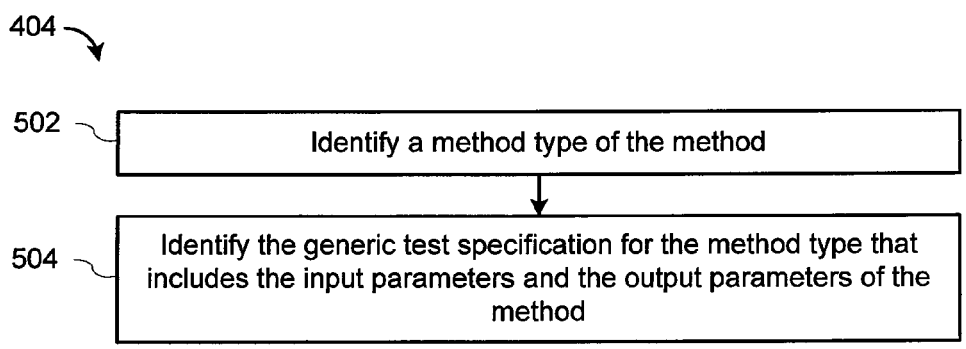
FIG. 5 is a flowchart of a method for identifying a generic test specification for the method, according to some embodiments.

FIG. 5 is a flowchart of a method for identifying (402) a generic test specification for the method, according to some embodiments. The test module 102 identifies (502) a method type of the method and identifies (504) the generic test specification for the method type that includes the input parameters and the output parameters of the method.

Figure 6:
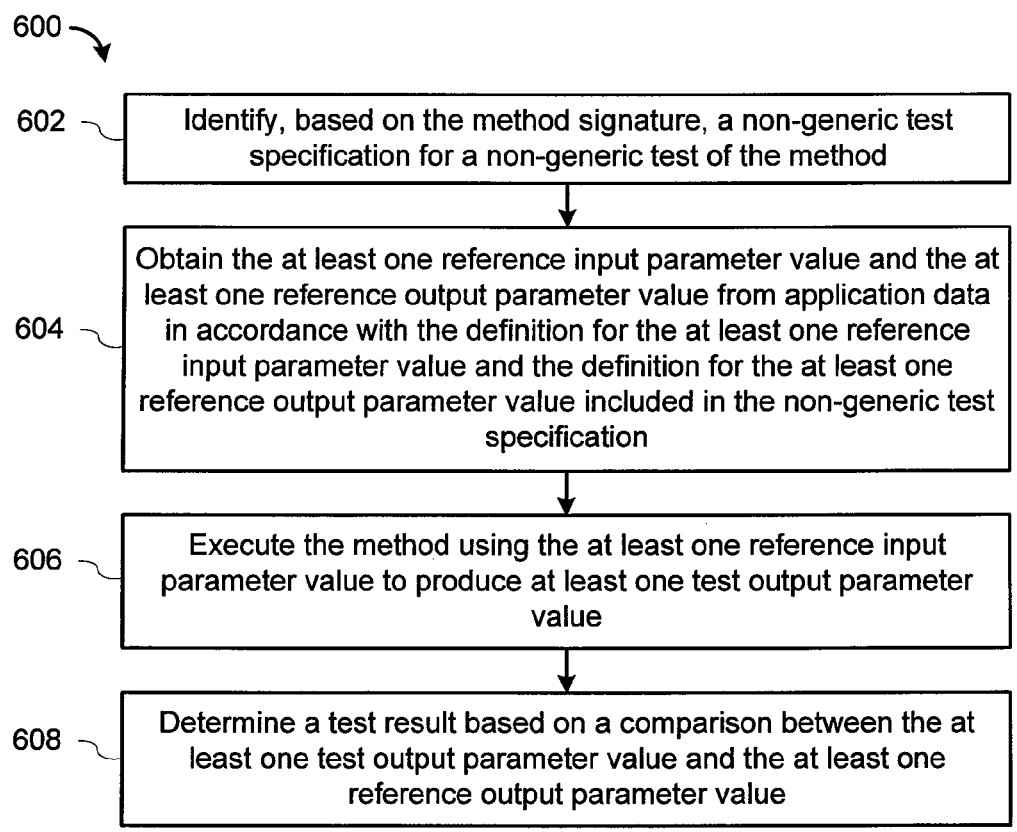
FIG. 6 is a flowchart of another method for testing the software unit of the application using a non-generic test, according to some embodiments.

FIG. 6 is a flowchart of a method 600 for testing the software unit of the application using a non-generic test, according to some embodiments. The test module 102 identifies (602), based on the method signature, a non-generic test specification for a non-generic test of the method. In some embodiments, the non-generic test specification is usable to test functionality that is distinct across the plurality of methods. In some embodiments, the non-generic test specification includes a definition for at least one reference input parameter value of the method and a definition for at least one reference output parameter value of the method.

The test module 102 then obtains (604) the at least one reference input parameter value and the at least one reference output parameter value from application data in accordance with the definition for the at least one reference input parameter value and the definition for the at least one reference output parameter value included in the non-generic test specification. In some embodiments, the at least one reference input parameter value defined in the non-generic test specification is a valid value determined from the application data.

Next, the test module 102 executes (606) the method using the at least one reference input parameter value to produce at least one test output parameter value.

Figure 7:
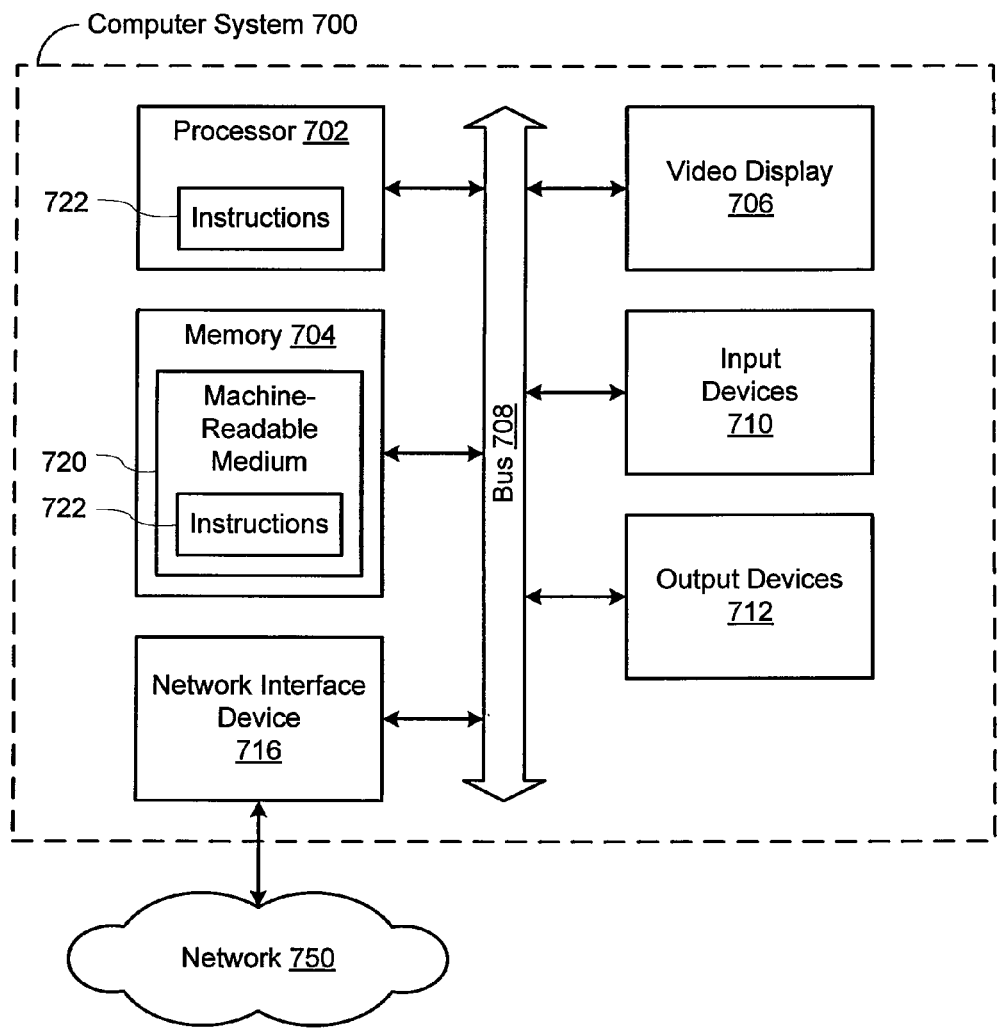
FIG. 7 is a block diagram illustrating a machine, according to some embodiments.

The test module 102 then determines a test result based on a comparison between the at least one test output parameter value and the at least one reference output parameter value. In some embodiments, the test result indicates that the method passes the non-generic test when the at least one test output parameter value corresponds to the at least one reference output parameter value. In some embodiments, the test result indicates that the method fails the non-generic test when the at least one test output parameter value does not correspond to the at least one reference output parameter value Exemplary Machine FIG. 7 depicts a block diagram of a machine in the example form of a computer system 700 within which may be executed a set of instructions for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in a server-client network environment or as a peer machine in a peer-to-peer (or distributed) network environment.

The machine is capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example of the computer system 700 includes a processor 702 (e.g., a central processing unit (CPU), a graphics processing unit (GPU) or both), and memory 704, which communicate with each other via bus 708. Memory 704 includes volatile memory devices (e.g., DRAM, SRAM, DDR RAM, or other volatile solid state memory devices), non-volatile memory devices (e.g., magnetic disk memory devices, optical disk memory devices, flash memory devices, tape drives, or other non-volatile solid state memory devices), or a combination thereof. Memory 704 may optionally include one or more storage devices remotely located from the computer system 700. The computer system 700 may further include video display unit 706 (e.g., a plasma display, a liquid crystal display (LCD) or a cathode ray tube (CRT)). The computer system 700 also includes input devices 710 (e.g., keyboard, mouse, trackball, touchscreen display, etc.), output devices 712 (e.g., speakers), and a network interface device 716. The aforementioned components of the computer system 700 may be located within a single housing or case (e.g., as depicted by the dashed lines in FIG. 7). Alternatively, a subset of the components may be located outside of the housing. For example, the video display unit 706, the input devices 710, and the output device 712 may exist outside of the housing, but be coupled to the bus 708 via external ports or connectors accessible on the outside of the housing.

Memory 704 includes a machine-readable medium 720 on which is stored one or more sets of data structures and instructions 722 (e.g., software) embodying or utilized by any one or more of the methodologies or functions described herein. The one or more sets of data structures may store data. Note that a machine-readable medium refers to a storage medium that is readable by a machine (e.g., a computer-readable storage medium). The data structures and instructions 722 may also reside, completely or at least partially, within memory 704 and/or within the processor 702 during execution thereof by computer system 700, with memory 704 and processor 702 also constituting machine-readable, tangible media.

The data structures and instructions 722 may further be transmitted or received over a network 750 via network interface device 716 utilizing any one of a number of well-known transfer protocols (e.g., HyperText Transfer Protocol (HTTP)). Network 750 can generally include any type of wired or wireless communication channel capable of coupling together computing nodes (e.g., the computer system 700). This includes, but is not limited to, a local area network, a wide area network, or a combination of networks. In some embodiments, network 750 includes the Internet Certain embodiments are described herein as including logic or a number of components, modules, or mechanisms. Modules may constitute either software modules (e.g., code and/or instructions embodied on a machine-readable medium or in a transmission signal) or hardware modules. A hardware module is a tangible unit capable of performing certain operations and may be configured or arranged in a certain manner. In example embodiments, one or more computer systems (e.g., the computer system 700) or one or more hardware modules of a computer system (e.g., a processor 702 or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor 702 or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor 702 configured using software, the general-purpose processor 702 may be configured as respective different hardware modules at different times. Software may accordingly configure a processor 702, for example, to constitute a particular hardware module at one instance of time and to constitute a different hardware module at a different instance of time.

Modules can provide information to, and receive information from, other modules. For example, the described modules may be regarded as being communicatively coupled. Where multiples of such hardware modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

The various operations of example methods described herein may be performed, at least partially, by one or more processors 702 that are temporarily configured (e.g., by software, code, and/or instructions stored in a machine-readable medium) or permanently configured to perform the relevant operations. Whether temporarily or permanently configured, such processors 702 may constitute processor-implemented (or computer-implemented) modules that operate to perform one or more operations or functions. The modules referred to herein may, in some example embodiments, comprise processor-implemented (or computer-implemented) modules.

Moreover, the methods described herein may be at least partially processor-implemented (or computer-implemented) and/or processor-executable (or computer-executable). For example, at least some of the operations of a method may be performed by one or more processors 702 or processor-implemented (or computer-implemented) modules. Similarly, at least some of the operations of a method may be governed by instructions that are stored in a computer readable storage medium and executed by one or more processors 702 or processor-implemented (or computer-implemented) modules. The performance of certain of the operations may be distributed among the one or more processors 702, not only residing within a single machine, but deployed across a number of machines. In some example embodiments, the processors 702 may be located in a single location (e.g., within a home environment, an office environment or as a server farm), while in other embodiments the processors 702 may be distributed across a number of locations.

While the embodiment(s) is (are) described with reference to various implementations and exploitations, it will be understood that these embodiments are illustrative and that the scope of the embodiment(s) is not limited to them. In general, techniques for the embodiments described herein may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the embodiment(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the embodiment(s).

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles and its practical applications, to thereby enable others skilled in the art to best utilize the embodiments and various embodiments with various modifications as are suited to the particular use contemplated.

What is claimed is:

1. A method comprising:
receiving a first method signature for a first method of a software unit of an application, the first method signature comprising a plurality of parameters including at least one input parameter and at least one output parameter;
identifying, based only on the at least one input parameter and the at least one output parameter of the first method signature without using a method name of the first method and using at least one processor, a generic test specification for a generic test of the first method, the generic test specification being one of a plurality of test specifications, wherein each generic test specification is identified by an associated method signature, and wherein the generic test specification includes a definition for at least one reference input parameter value of the first method corresponding to the at least one input parameter and a definition for at least one reference output parameter value of the first method corresponding to the at least one output parameter;
executing the first method using the at least one reference input parameter value to produce at least one test output parameter value; and
determining a test result based on a comparison between the at least one test output parameter value and the at least one reference output parameter value.

2. The method of claim 1, further comprising, prior to executing the first method using the at least one reference input parameter value to produce at least one test output parameter value, obtaining the at least one reference input parameter value and the at least one reference output parameter value from application data in accordance with the definition for the at least one reference input parameter value and the definition for the at least one reference output parameter value included in the generic test specification.

3. The method of claim 1, wherein the test result indicates that the first method passes the generic test when each of the at least one test output parameter value corresponds to each of the at least one reference output parameter value.

4. The method of claim 1, further comprising:
identifying, based on the first method signature, a non-generic test specification for a non-generic test of the first method, wherein the non-generic test specification includes a definition for at least one non-generic reference input parameter value of the first method and a definition for at least one non-generic reference output parameter value of the first method;
obtaining the at least one non-generic reference input parameter value and the at least one non-generic reference output parameter value from application data in accordance with the definition for the at least one non-generic reference input parameter value and the definition for the at least one non-generic reference output parameter value included in the non-generic test specification;
executing the first method using the at least one non-generic reference input parameter value to produce at least one non-generic test output parameter value; and
determining a non-generic test result based on a comparison between the at least one non-generic test output parameter value and the at least one non generic reference output parameter value.

5. The method of claim 4, wherein the non-generic test result indicates that the first method passes the non-generic test. when the at least one non-generic test output parameter value corresponds to the at least one non-generic reference output parameter value, and wherein the non-generic test result indicates that the first method fails the non-generic test when the at least one non-generic test output parameter value does not correspond to the at least one non-generic reference output parameter value.

6. The method of claim 4, wherein the at least one non-generic reference input parameter value defined in the non-generic test specification is a valid value determined from the application data.

7. The method of claim 1, wherein the at least one reference input parameter value defined in the generic test specification is an invalid value determined from application data.

8. The method of claim 1, wherein the software unit of the application is a business object that includes methods executable to perform operations associated with business logic.

9. The method of claim 1, wherein the application is one of a plurality of applications conforming to a software architecture paradigm.

10. The method of claim 1, wherein the generic test specification is usable to perform a negative test that tests whether the first method produces expected values for an output parameter in response to invalid values for input parameters.

11. The method of claim 1, wherein the plurality of test specifications is included in a test class for the application.

12. The method of claim 1, wherein the generic test specification includes a definition for at least one reference exception for the first method.

13. The method of claim 1, further comprising:
receiving a second method signature for a second method, the second method signature comprising a plurality of parameters including at least one input parameter and at least one output parameter, the second method having different source code from the first method;
identifying, based only on the parameters of the second method signature, a generic test specification for a generic test of the second method, the generic test specification for the generic test of the second method being the generic test specification for the generic test of the first method, wherein the generic test specification includes a definition for at least one reference input parameter value of the second method corresponding to the at least one input parameter of the second method signature and a definition for at least one reference output parameter value of the second method corresponding to the at least one output parameter of the second method signature;
executing the second method using the at least one reference input parameter value to produce at least one second test output parameter value; and
determining a second test result based on a comparison between the at least one second test output parameter value and the at least one reference output parameter value.

14. The method of claim 1, wherein the test result indicates that the first method fails the generic test when each of the at least one test output parameter value does not correspond to each of the at least one reference output parameter value.

15. A system to test a software unit of an application, comprising:
at least one processor;
memory; and at least one program stored in the memory, the at least one program comprising instructions to:
receive a first method signature for a first method of the software unit of the application, the first method signature comprising a plurality of parameters including at least one input parameter and at least one output parameter, the first method signature further comprising a method type;
identify, based only on the at least one input parameter, the at least one output parameter, and the method type of the first method signature without using a method name of the first method and using at least one processor, a generic test specification for a generic test of the first method, the generic test specification being one of a plurality of test specifications, wherein each generic test specification is identified by an associated method signature, wherein the generic test specification is usable to test functionality that is common across a plurality of methods, and wherein the generic test specification includes a definition for at least one reference input parameter value of the first method corresponding to the at least one input parameter and a definition for at least one reference output parameter value of the first method corresponding to the at least one output parameter;
execute the first method using the at least one reference input parameter value to produce at least one test output parameter value; and
determine a test result based on a comparison between the at least one test output parameter value and the at least one reference output parameter value.

16. The system of claim 15, further comprising instructions to obtain, prior to executing the first method using the at least one reference input parameter value to produce at least one test output parameter value, the at least one reference input parameter value and the at least one reference output parameter value from application data in accordance with the definition for the at least one reference input parameter value and the definition for the at least one reference output parameter value included in the generic test specification.

17. The system of claim 15, wherein the test result indicates that the first method passes the generic test when each of the at least one test output parameter value corresponds to each of the at least one reference output parameter value.

18. The system of claim 15, wherein the test result indicates that the first method fails the generic test when each of the at least one test output parameter value does not correspond to each of the at least one reference output parameter value.

19. A non-transitory computer readable storage medium storing at least one program configured for execution by a computer, the at least one program comprising instructions to:
receive a method signature for a method of a software unit of an application, the method signature comprising a plurality of parameters including at least one input parameter and at least one output parameter;
identify, based only on the at least one input parameter and the at least one output parameter of the method signature without using a method name of the first method and using at least one processor, a generic test specification for a generic test of the method, the generic test specification being one of a plurality of test specifications, wherein each generic test specification is identified by an associated method signature, wherein the generic test specification is usable to test functionality that is common across a plurality of methods, and wherein the generic test specification includes a definition for at least one reference input parameter value of the method corresponding to the at least one input parameter and a definition for at least one reference output parameter value of the method corresponding to the at least one output parameter;
execute the method using the at least one reference input parameter value to produce at least one test output parameter value; and
determine a test result based on a comparison between the at least one test output parameter value and the at least one reference output parameter value.

* * * * *